United States Patent [19]

Wakayama et al.

[11] Patent Number: 4,913,541
[45] Date of Patent: Apr. 3, 1990

[54] FOLDING BINOCULARS

[76] Inventors: Shouji Wakayama; Akio Akiyama, both of c/o Youngs Optical Co., Ltd., No. 2-16-12, Tateishi, Katsushika-ku, Tokyo, Japan

[21] Appl. No.: 244,475
[22] Filed: Sep. 15, 1988
[51] Int. Cl.⁴ ............................................. G02B 23/18
[52] U.S. Cl. ...................................... 350/546; 350/140
[58] Field of Search ............... 350/545, 546, 140, 145, 350/146

[56] References Cited

U.S. PATENT DOCUMENTS 2,943,409  7/1960  Maiershofer ...................... 350/140
4,468,874  9/1984  Chiodo ............................... 350/140

FOREIGN PATENT DOCUMENTS 323005   7/1920   Fed. Rep. of Germany ...... 350/546
22211    of 1894  United Kingdom ................ 350/546

Primary Examiner—Rodney B. Bovernick
Assistant Examiner—Martin Lerner
Attorney, Agent, or Firm—Witherspoon & Hargest

[57] ABSTRACT

Folding binoculars in which left and right eyepiece frames, each carrying an eyepiece, are swingably supported in such a manner as to be able to open and close with respect to each other, and objective frames, each carrying an objective, are mounted on the eyepiece frames in such a manner as to be able to project from and retract into the eyepiece frames. When the eyepiece frames are swung open, the objective frames are projected to and fixed at the front portions of the eyepiece frames, thereby bringing the optical axis of the objectives into alignment with those of the eyepieces, and thereby rendering the binoculars usable. When the binoculars are not in use, they can be folded to form a compact structure by moving the eyepiece frames toward each other to close.

6 Claims, 3 Drawing Sheets

FOLDING BINOCULARS

BACKGROUND OF THE INVENTION

1. Field of the Invention

The present invention relates to a pair of folding binoculars in which a pair consisting of left and right eyepiece frames are swingably supported in such a manner as to be able to open and close with respect to each other, the binoculars being rendered usable when the eyepiece frames are opened add objective frames are projected and fixed in place, the binoculars being capable of folding to form a compact structure when they are not in use.

2. Prior Art

Folding binoculars of various structures and types have hitherto been proposed, which may be used as opera glasses for watching theatrical plays or sports such as baseball games, soccer games, and boxing matches.

However, conventionally-proposed folding binoculars are heavy because they are made of metals and comprise a lot of component parts. Further, they are large-sized and cannot be carried easily. They are also disadvantageous in that manufacturing processes are complicated and production costs are very high.

To cope with these disadvantages, the present applicant has previously proposed, in Japanese Utility Model Laid-Open No. 50920/1986, folding binoculars having a case comprising a base body and a lid body mounted on an eyepiece base portion in such a manner as to be able to open and close, objective supporting frames accommodated within the case and adapted to be set up and pushed down by virtue of springs, and a position adjusting mechanism for adjusting the movement of eyepieces in the to-and-fro direction. The component parts of the binoculars are formed of synthetic resins, thereby allowing the binoculars to be very light and be manufactured at low production costs.

With these binoculars, however, since the eyepieces are connected to the position adjusting mechanism via the eyepiece base portion, the objective supporting frames alone are adapted to be set up and pushed down. As a result, even when the objective supporting frames are pushed down and the entire structure is made compact in this way, the thus achieved structure cannot be thinner than the diameter of the eyepieces. Therefore, with the above-described folding binoculars, it has been possible to make the entire structure compact only to a limited extent.

In recent years, various daily necessities and sundries have become fashionable and colorful, and binoculars have been showing the same tendency. From this viewpoint, the binoculars that have conventionally been proposed as well as the binoculars that have previously been proposed by the present applicant have an outer appearance which maintains a basic configuration of a pair of binoculars even after the entire structure has been made thin and compact. Thus, the folding of these binoculars has not been able to provide a shape which is surprising or interesting, so to speak.

SUMMARY OF THE INVENTION

The present invention has been accomplished in view of the above-described circumstances, and an object of the present invention is to provide folding binoculars which have fundamental functions required of a pair of binoculars, and which are simultaneously able to be made more compact and more convenient to carry, and are further able to provide a surprising and interesting external shape.

To this end, according to the present invention, there is provided folding binoculars comprising a pair consisting of left and right eyepiece frames which are each provided with an eyepiece and which are swingably supported by a support and coupled to each other via the support in such a manner as to be able to open and close with respect to each other, and a pair of objective frames which are each provided with an objective and are each mounted on each of the eyepiece frames in such a manner as to be able to project from and retract into the eyepiece frame, wherein the objective frames are projected to and fixed at the front portions of the eyepiece frames when the eyepiece frames are swung open, the optical axes of the objectives and the optical axes of the eyepieces being aligned with a state in which the eyepiece frames are open.

With the folding binoculars in accordance with the present invention, when the binoculars are to be used, the eyepiece frames are swung to open with respect to each other, thereby allowing the objective frames to project from the swung eyepiece frames.

After this action, when the objective frames are suitably fixed in place, the objectives provided in the objective frames have their optical axes aligned with those of the eyepieces.

The folding binoculars are used as ordinary binoculars when a person looks through the eyepieces. After use, the eyepiece frames are swung toward each other to be closed. By this operation, the objective frames become accommodated within the eyepiece frames, thereby providing a compact configuration of the entire structure.

BRIEF DESCRIPTION OF THE DRAWINGS

The drawings illustrate one embodiment of the present invention, in which.

DESCRIPTION OF THE PREFERRED EMBODIMENT

Figure 1:
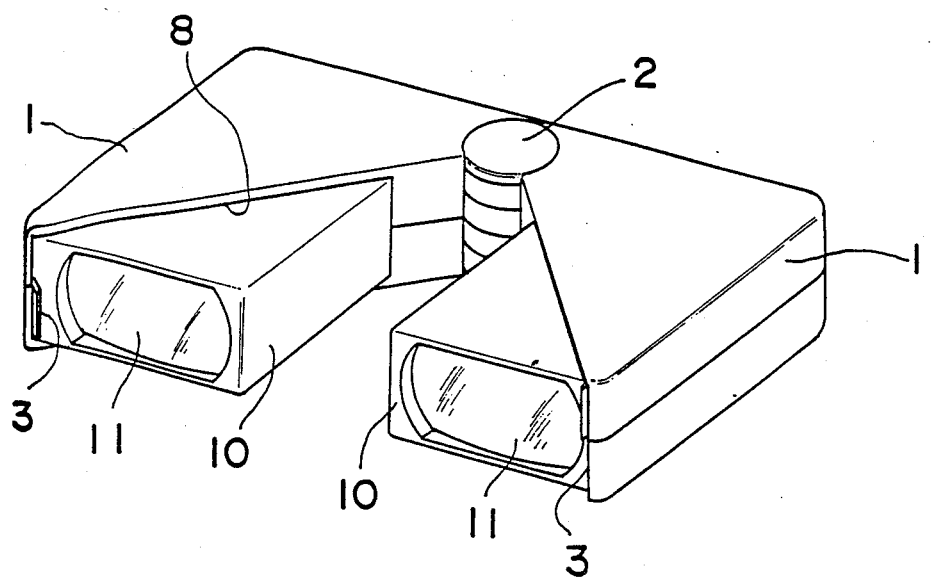
FIG. 1 is a perspective view of folding binoculars in accordance with the present invention, showing a state in which eyepiece frames are open and the binoculars are usable.

One embodiment of the present invention will be described hereunder with reference to the drawings.

Folding binoculars in accordance with the present invention comprise a pair consisting of left and right eyepiece frames 1 swingably supported by a support 2 and are coupled via the support, and objective lens frames 10 mounted on the eyepiece frames 10 in such a manner as to be able to project from and retract into the eyepiece frames 1. When the binoculars are folded to form a compact structure, they have a planar configuration which is substantially rectangular, as indicated by two-dot chain lines in FIG. 3. Each of the eyepiece frames 1 itself is formed with a substantially right-triangular configuration on the plane along which the frames 1 are each swingable. Each eyepiece frame 1 is swung about one corner portion thereof when it is, for instance, opening. The left and right eyepiece frames 1 open or close with respect to each other when they are swung away from or toward each other.

The left and right eyepiece frames 1 have exactly the same structure. Therefore, they can be joined and assembled by preparing them as identical units and coupling them in such a manner that one of the units is disposed upside down. Because the left and right eyepiece frames 1 have the same structure, it is possible to reduce production costs pertaining to molds and, hence, to reduce the total production costs.

The support 2 is provided at the joint of one ends of the hypotenuse portions of the eyepiece frames 1. The other ends serve as free end portions 3, described in detail later, which are engageable with each other.

Figure 5:
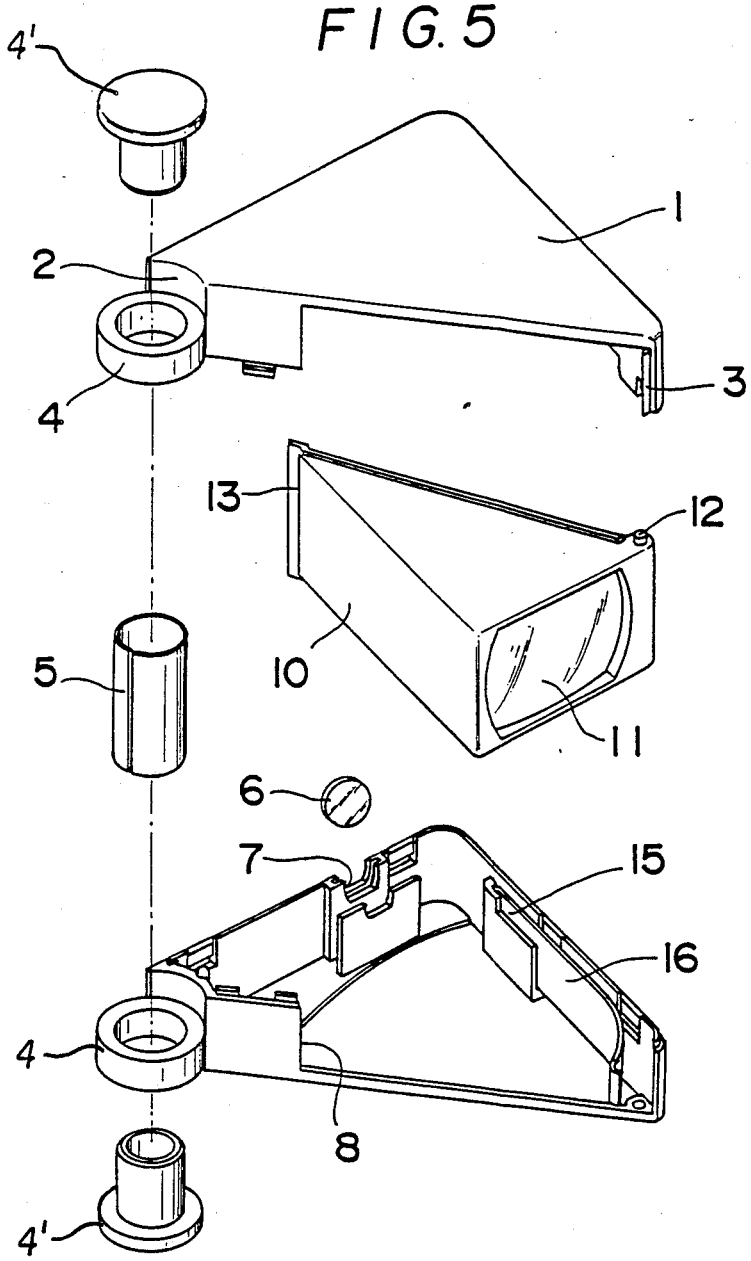
FIG. 5 is an exploded perspective view of one of the eyepiece frames.

As shown in FIG. 5, at the support 2, a pair consisting of annular coupling rings 4 provided at a predetermined vertical interval projects from each of the eyepiece frames 1. The pairs of coupling rings 4 that project from the right and left eyepiece frame 1 to the support 2 are vertically and alternately superimposed, and an axial pin 5 is passed through the coupling rings 4. The axial pin 5 is formed of a hollow tubular member provided with a slit. After the pin 5 is passed through the coupling rings 4, caps 4 are fitted into the upper most and lowermost rings, thereby improving the appearance of the support 2.

Further, the support 2 accommodates therein a spring mechanism (not shown) whereby the left and right eyepiece frames 1 are always urged in the opening direction. By virtue of this arrangement, when the free end portions 3 of the frames 1 are released from their engagement with each other, the frames 1 are automatically opened in the lateral direction by the force of the spring, and the binoculars are thus brought into their usable state.

The arrangement of the free end portions 3 is such that an upper portion of one of the free end portions 3 of the corresponding frame 1 slightly projects, while a lower portion of the other free end portion 3 of the other frame 1 also slightly projects, so that the left and right frames 1 are engageable with each other on the inner sides of the free end portions 3.

Figure 4:
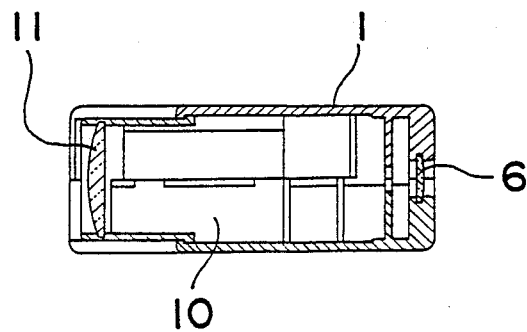
FIG. 4 is a sectional view taken along a plane including a line passing through an eyepiece and an objective.

Eyepieces 6 are each provided in each eyepiece frame 1 at a position between the support 2 and the right-angle corner portion of the frame 1. If each of the eyepiece frames 1 is formed by joining its two parts, i.e., upper and lower parts, as in the illustrated embodiment, mounting grooves 7 are formed in certain edges of the parts to be joined, and an eyepiece 6 is fitted into the mounting grooves 7 and is thus fixed in place (see FIGS. 4 and 5).

The objective frames 10 which are mounted on the eyepiece frames 1 are provided with objectives 11. The optical axes of the objectives 11 are adapted to be aligned with the optical axes of the eyepieces 6 provided in the eyepiece frames 1. The objective frames 10 are mounted on the eyepiece frames 1 in such a manner as to be able to project and retract through projection/retraction openings 8 formed and opening in the hypotenuse portions of the frames 1. When the left and right eyepiece frames 1 are opening, the objective frames 10 project from the frames 1 and the optical axes of the objectives 11 and those of the eyepieces 6 are brought into alignment.

In the illustrated embodiment, each of the objective frames 10 is formed with a substantially right-triangular planar configuration. One end of the hypotenuse portion of each frame 10 is swingably supported by the free end portion 3 of the corresponding eyepiece frame 1 in such a manner that the objective frames 10 are swingable relative to the eyepiece frames 1 and are able to project from and retract into the frames 1. During unfolding, the objective frames 10 are swung until their bases become flush with the hypotenuses portions of the eyepiece frames 1, and by this action, the frames 10 become completely received within the frames 1. The structure for swingably supporting the objective frames 10 is shown in FIG. 5. Supporting projections 12 are provided on the upper and lower sides of a portion of each objective frame 10 at which it is supported, and the supporting projections 12 are fitted into recess-shaped bearing portions which are formed on the inner sides of the upper and lower surfaces of the free end portions 3 of the frames 1.

Each of the objectives 11 is provided on the base portion of each objective frame 10 that is between the objective frame supporting portion and the right-angle corner portion of the frame 10. Each objective 11 is fixed in place by, for instance, being force-fitted inside the objective frame 10.

In order to align the optical axes of the eyepieces 6 and those of the objectives 11 and also set and fix the projected objective frames 10 at a position with which these axes are kept aligned, stoppers 13 are provided at the ends of the hypotenuse portions of the objective frames 10 that are remote from the supporting portions of the frames 10. The stoppers 13 are each engageable with an inner surface of the eyepiece frame 1 which is immediately adjacent to the projection/retraction opening 8.

Figure 2:
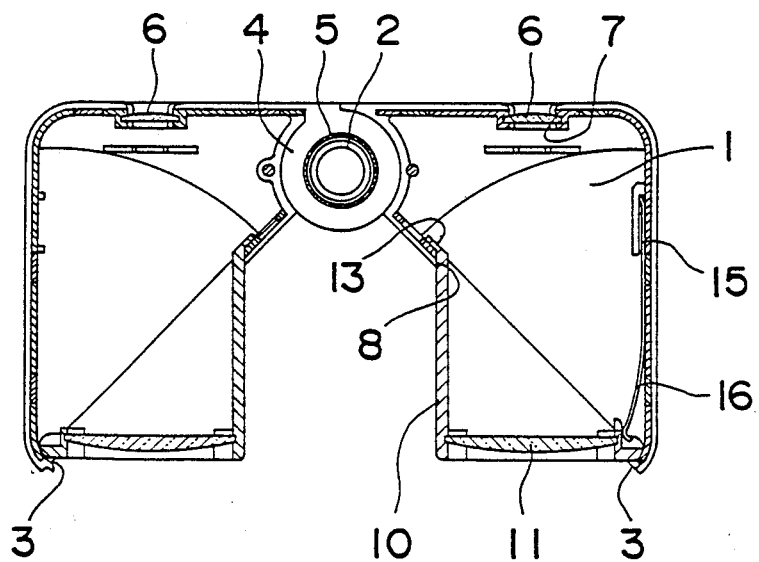
FIG. 2 is a sectional view of the binoculars which are in the same state.
Figure 3:
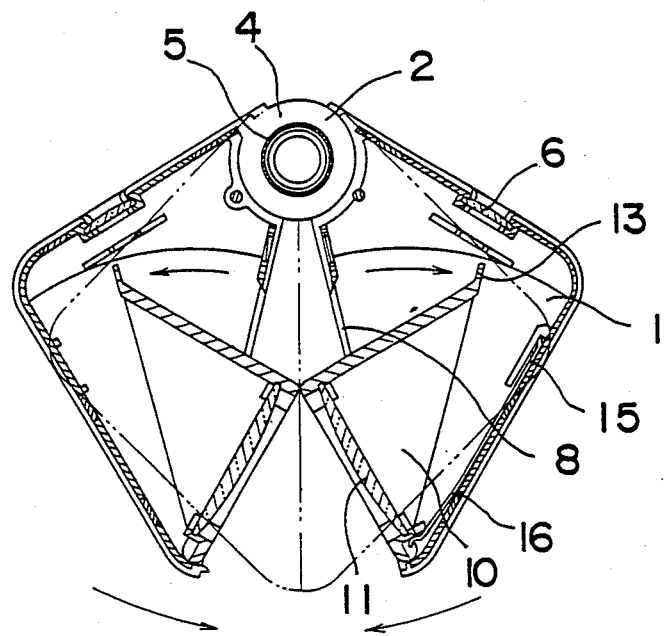
FIG. 3 is a sectional view of the binoculars which are being folded.

The objective frames 10 are adapted to project automatically and simultaneously with the movement of the eyepiece frames 1 away from each other to open. Means provided for this purpose is projecting mechanisms 15 (only one of which is shown) in which spring force is employed. As shown in FIGS. 2 and 3, each of the projecting mechanisms 15 has a resilient plate spring 16. One end of each resilient plate spring 16 is fixed to an inner surface of the corresponding the eyepiece frame 1 at a position between the free end portion 3 and the right-angle corner portion of the frame 1, while the other end of the spring 16, i.e. a free end thereof, is engaged with an inner surface of the supporting portion of the corresponding objective frame 10, whereby the resilience of the springs 16 always urges the objective frames 10 in the projecting direction thereof. By virtue of the provision of the projecting mechanisms 15, when the eyepiece frames 1 are moved away from each other to open, the objective frames 10 automatically project until they are set and fixed at a position with which the optical axes of the objectives 11 are kept aligned with those of the eyepieces 6. Conversely, when the eyepiece frames 1 are moved toward each other to close, the objective frames 10 retract into the eyepiece frames 10 against the resilience of the plate spring 16.

Thus, with an arrangement in which the objective frames 10 are always urged by the resilience of springs 16 of the built-in projecting mechanisms 15, the handling of the binoculars is facilitated to a great extent.

A spring of a different type may be adopted in place of the plate spring 16, and a suitable example is a spiral spring.

It is naturally possible to omit the projecting mechanisms 15. In this case, however, it is necessary to adopt certain means of projecting the objective frames 10 and maintaining at least temporarily the state in which the optical axes of the eyepieces 6 and those of the objectives 11 are aligned.

Although in the illustrated embodiment each of the eyepieces 6 is circular and each of the objectives 11 is generally rectangular with its lateral edges curved, the present invention is not limited thereto, and the configurations of the lenses 6 and 11 can be selected as desired. The material forming the lenses 6 and 11 is not limited to glass, and they may be alternatively be formed of a plastic material. In case where the lenses are formed of a plastic material, they can be formed integrally with the eyepiece frames 1 or the objective frames 10.

Next, an example of the use of the folding binoculars will be explained. As shown in FIGS. 1 to 3, the eyepiece frames 1 are moved away from each other to open, thereby allowing the objective frames 10 to project from the opening eyepiece frames 1 through the projection/retraction openings 8 formed in the hypotenuse portions of the frames 1. During this operation, the objective frames automatically project from the eyepiece frames 1 by virtue of the resilience provided by the projecting mechanisms 15, until the optical axes of the objectives 11 provided on the objective frames 10 align with those of the eyepieces 6 provided on the eyepiece frames 1. The folding binoculars are used as ordinary binoculars with which a person looks through the eyepieces 6. After use, the eyepiece frames 1 are moved toward each other to close. By this operation, the objective frames 10 retract into the eyepiece frames 1 against the resilience provided by the projecting mechanism 15, thereby providing a compact configuration of the entire structure, which is rectangular when viewed in a plane.

The folding binoculars in accordance with the present invention has the above-described construction. When the binoculars are not in use, they can be folded to form a compact and small structure. During use, when the eyepiece frames 1 are moved away from each other to open, the objective frames 10 project, thereby enabling the binoculars to serve as ordinary binoculars.

This effect is provided by virtue of an arrangement in which a pair consisting of left and right eyepiece frames 1 which are each provided with an eyepiece 6 and which are swingably supported by a support 2 and coupled to each other via the support in such a manner as to be able to open and close with respect to each other, and a pair of objective frames 10 which are each provided with an objective 11 and are each mounted on each of the eyepiece frames 1 in such a manner as to be able to project from and retract into the eyepiece frame. The objective frames 10 are projected to and fixed at the front portions of the eyepiece frames when the eyepiece frames 1 are swung open, and the optical axes of the objectives 11 and the optical axes of the eyepieces 6 are aligned with a state in which the eyepiece frames 1 are open. Thus, the folding binoculars of the present invention have basic functions required of a pair of binoculars, and they are simultaneously able to make the entire structure compact and portable to an enhanced extent, and are further able to provide a surprising and interesting external shape.

In view of the fact that various daily necessities and sundries have recently become fashionable and colorful, the folding binoculars of the present invention are also advantageous in practical terms. For instance, when they are in the folded state forming a compact structure, their outer appearance does not suggest that they are a pair of binoculars, thereby rendering the binoculars very interesting and new.

What is claimed is:

1. Folding binoculars, comprising:
   a left eyepiece frame formed by a wall which encloses a first cavity, and including a left eyepiece which is fixed in place relative to and forms a part of said wall and which has a left eyepiece optical axis which is fixed relative to said left eyepiece frame;
   a right eyepiece frame formed by a wall which encloses a second cavity, and including a right eyepiece which is fixed in place relative to and forms a part of said wall and which has a right eyepiece optical axis which is fixed relative to said right eyepiece frame;
   a support coupled to said left eyepiece frame and said right eyepiece frame for swingably supporting said left eyepiece frame and said right eyepiece frame relative to each other in such a manner as to be able to open and close said left eyepiece frame and said right eyepiece frame with respect to each other;
   a left objective frame including a left objective lens fixed in place relative to said left objective frame and having a left objective optical axis which is fixed relative to said left objective frame;
   a right objective frame including a right objective lens fixed in place relative to said right objective frame and having a right objective optical axis which is fixed relative to said right objective frame;
   means coupling said left objective frame to said left eyepiece frame for retracting said left objective frame into said first cavity when said left eyepiece frame and said right eyepiece frame are closed with respect to each other and for projecting said left objective frame from said first cavity such that said left objective optical axis is aligned with said left eyepiece optical axis when said left eyepiece frame and said right eyepiece frame are open with respect to each other; and
   means coupling said right objective frame to said right eyepiece frame for retracting said right objective frame into said second cavity when said left eyepiece frame and said right eyepiece frame are closed with respect to each other and for projecting said right objective frame from said second cavity such that said right objective optical axis is aligned with said right eyepiece optical axis when said left eyepiece frame and said right eyepiece frame are open with respect to each other.

2. Folding binoculars according to claim 1, further comprising projecting mechanisms provided with springs and accommodated within said objective frames, said objective frames being urged by the springs to project outward relative to a respective cavity.

3. Folding binoculars according to claim 1, wherein each of said eyepiece frames has a substantially right-triangular planar configuration whereby said eyepiece frames have a substantially rectangular planar configuration when said eyepiece frames have been swung toward to each other and are closed.

4. Folding binoculars according to claim 3, further comprising projecting mechanisms provided with springs and accommodated within said objective frames, said objective frames being urged by the springs to project outward relative to a respective cavity.

5. Folding binoculars comprising: a pair consisting of left and right eyepiece frames which are each provided with an eyepiece having an optical axis and which are swingably supported by a support and coupled to each other via said support in such a manner as to be able to be open and close with respect to each other, each of said eyepiece frames having a substantially right-triangular planar configuration whereby said eyepiece frames have a substantially rectangular planar configuration when said eyepiece frames have been swung toward each other and are closed, and a pair of objective frames which are each provided with an objective having an optical axis and are each mounted on each of said eyepiece frames in such a manner as to be able to project from and retract into the eyepiece frame, wherein said objective frames are projected to and fixed at respective front portions of said eyepiece frames when said eyepiece frames are swung open, the optical axes of said objectives and the optical axes of said eyepieces being aligned with a state in which said eyepiece frames are open.

6. Folding binoculars according to claim 5, further comprising projecting mechanisms provided with springs and accommodated within said objective frames, said objective frames being urged by said springs in a direction in which said objective frames project outward.

* * * * *